United States Patent
Lennen

(10) Patent No.: US 8,072,376 B2
(45) Date of Patent: Dec. 6, 2011

(54) METHOD AND APPARATUS FOR MITIGATING THE EFFECTS OF CROSS CORRELATION IN A GPS RECEIVER

(75) Inventor: Gary Lennen, Cupertino, CA (US)

(73) Assignee: SiRF Technology Inc., San Jose, CA (US)

( * ) Notice: Subject to any disclaimer, the term of this patent is extended or adjusted under 35 U.S.C. 154(b) by 326 days.

(21) Appl. No.: 12/340,498

(22) Filed: Dec. 19, 2008

(65) Prior Publication Data

US 2009/0322604 A1    Dec. 31, 2009

Related U.S. Application Data

(60) Provisional application No. 61/076,600, filed on Jun. 27, 2008.

(51) Int. Cl.
G01S 19/24    (2010.01)
G01S 19/09    (2010.01)

(52) U.S. Cl. ............................. 342/357.63; 342/357.46

(58) Field of Classification Search ............. 342/357.26, 342/357.42, 357.63, 357.71, 357.46; 701/207, 701/213
See application file for complete search history.

(56) References Cited

U.S. PATENT DOCUMENTS

| | | | |
|---|---|---|---|
| 5,663,734 A | 9/1997 | Krasner |
| 5,663,735 A | 9/1997 | Eshenbach |
| 5,781,156 A | 7/1998 | Krasner |
| 5,812,087 A | 9/1998 | Krasner |
| 5,825,327 A | 10/1998 | Krasner |
| 5,831,574 A | 11/1998 | Krasner |
| 5,841,396 A | 11/1998 | Krasner |
| 5,874,914 A | 2/1999 | Krasner |
| 5,884,214 A | 3/1999 | Krasner |
| 5,945,944 A | 8/1999 | Krasner |
| 5,999,124 A | 12/1999 | Sheynblat |
| 6,002,363 A | 12/1999 | Krasner |
| 6,016,119 A | 1/2000 | Krasner |
| 6,052,081 A | 4/2000 | Krasner |
| 6,061,018 A | 5/2000 | Sheynblat |
| 6,064,336 A | 5/2000 | Krasner |
| 6,104,338 A | 8/2000 | Krasner |
| 6,104,340 A | 8/2000 | Krasner |
| 6,107,960 A | 8/2000 | Krasner |
| 6,111,540 A | 8/2000 | Krasner |
| 6,131,067 A | 10/2000 | Girerd |
| 6,133,871 A | 10/2000 | Krasner |
| 6,133,873 A | 10/2000 | Krasner |
| 6,133,874 A | 10/2000 | Krasner |
| 6,150,980 A | 11/2000 | Krasner |
| 6,185,427 B1 | 2/2001 | Krasner |
| 6,208,290 B1 | 3/2001 | Krasner |
| 6,208,291 B1 | 3/2001 | Krasner |
| 6,215,441 B1 | 4/2001 | Moeglein |
| 6,215,442 B1 | 4/2001 | Sheynblat |
| 6,236,354 B1 | 5/2001 | Krasner |
| 6,239,742 B1 | 5/2001 | Krasner |
| 6,259,399 B1 | 7/2001 | Krasner |
| 6,272,430 B1 | 8/2001 | Krasner |
| 6,289,041 B1 | 9/2001 | Krasner |

(Continued)

*Primary Examiner* — Dao Phan
(74) *Attorney, Agent, or Firm* — RatnerPrestia

(57) ABSTRACT

A positioning system receiver that mitigates cross correlation of received signals from positioning system satellite vehicles by generating the strong satellite vehicle signal and subtracting it from the received signal before correlation while eliminating the need for cross correlation signature without changing the C/A code.

28 Claims, 7 Drawing Sheets

U.S. PATENT DOCUMENTS

| | | |
|---|---|---|
| 6,307,504 B1 | 10/2001 | Sheynblat |
| 6,313,786 B1 | 11/2001 | Sheynblat |
| 6,314,308 B1 | 11/2001 | Sheynblat |
| 6,377,209 B1 | 4/2002 | Krasner |
| 6,408,196 B2 | 6/2002 | Sheynblat |
| 6,411,254 B1 | 6/2002 | Moeglein |
| 6,411,892 B1 | 6/2002 | Van Diggelen |
| 6,417,801 B1 | 7/2002 | Van Diggelen |
| 6,421,002 B2 | 7/2002 | Krasner |
| 6,429,814 B1 | 8/2002 | Van Diggelen et al. |
| 6,433,731 B1 | 8/2002 | Sheynblat |
| 6,453,237 B1 | 9/2002 | Fuchs et al. |
| 6,484,097 B2 | 11/2002 | Fuchs et al. |
| 6,487,499 B1 | 11/2002 | Fuchs et al. |
| 6,510,387 B2 | 1/2003 | Fuchs et al. |
| 6,542,821 B2 | 4/2003 | Krasner |
| 6,583,757 B2 | 6/2003 | Krasner |
| 6,597,311 B2 | 7/2003 | Sheynblat |
| 7,436,356 B2 * | 10/2008 | Bochkovskiy et al. .. 342/357.68 |

* cited by examiner

METHOD AND APPARATUS FOR MITIGATING THE EFFECTS OF CROSS CORRELATION IN A GPS RECEIVER

CROSS-REFERENCE To RELATED APPLICATIONS

This application claims priority under 35 U.S.C §119(e) to U.S. Provisional Application Ser. No. 61/076,600, titled "Method and Apparatus for Mitigating the Effects of Cross Correlation in a GPS Receiver," filed on Jun. 27, 2008, all of which is incorporated into this application by reference in its entirety.

BACKGROUND OF THE INVENTION

1. Field of Invention

This invention relates in general to satellite navigation systems and in particular to mitigating the effects of cross correlation in Global Positioning System (GPS) receivers.

2. Related Art

Cross correlation between a strong received satellite signal with the C/A (clear/acquisition) code of a weak satellite signal may prevent the weak satellite signal from being acquired/tracked. This problem may occur where the weak satellite signal is blocked by physical obstruction or in an indoor environment where the satellite signal is severely degraded. It is desirable to mitigate cross correlation in order to acquire/track the weak signal.

Past methods of cross correlation mitigation have included the classic post correlation subtraction method or the subspace projection method. The post correlation subtraction method typically relies on computing the cross correlation signature of the weak satellite C/A with a generated signal representing the strong satellite to be mitigated. The generated signal uses the carrier phase, carrier frequency, and code phase obtained from tracking of the strong satellite to estimate the received strong satellite signal. The correlation signature is then scaled by the estimated strong satellite amplitude and subtracted from the correlation of the received signal with the weak satellite C/A code. Alternatively, in the subspace projection method the correlation signature is compared against a threshold and the weak satellite C/A code is modified for received signal correlation so as to reduce the cross correlation of the strong satellite signal with the modified C/A and to enable the weak satellite signal to be acquired/tracked.

However, both the post correlation subtraction method and the subspace projection method suffer from poor mitigation performance in dynamic environments. Correlation signature is sensitive to the amplitude estimate error and phase estimate error of the strong satellite signal. Estimate of the satellite parameters may not be accurate due to Doppler and fading that often occurs in dynamic environments. In the subspace projection method, a different C/A code would have to be derived for each code phase position used in the correlation signature. Integration of the modified C/A code into the correlation with the received signal is also complicated to implement due to the code phase dependency of the correlation signature.

Therefore, there is a need for a system and method capable of mitigating the effects of cross correlation in a GPS receiver.

SUMMARY

The present invention mitigates cross correlation by generating a strong satellite vehicle (SV) signal and subtracting it from the received signal before correlation. It eliminates the requirement for cross correlation signature and does not change the C/A code. It does require the same accurate estimate of strong signal parameters from tracking the strong SV signal as in the previous post-correlation methods. However, the error sensitivity to amplitude error is reduced by estimating the strong SV amplitude using an amplitude control loop.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of this invention.

In the following description of examples of implementations, reference is made to the accompanying drawings that form a part hereof, and which show, by way of illustration, specific implementations of the invention that may be utilized. Other implementations may be utilized and structural changes may be made without departing from the scope of the present invention.

The present invention mitigates cross correlation by generating a strong satellite vehicle (SV) signal and subtracting it from a received signal before correlation. It eliminates the requirement for cross correlation signature and does not change the C/A code. It does require the same accurate estimate of strong signal parameters from tracking the strong SV signal as in the previous post-correlation methods. However, the error sensitivity to amplitude error is reduced by estimating the strong SV amplitude using an amplitude control loop.

Described herein are methods and systems for mitigating the cross correlation of a received signal with an SV C/A code in weak signal acquisition/tracking. The cross correlation to be mitigated can be between the received signal from a strong signal SV and the C/A code of a weak signal SV. The method described achieves the mitigation by estimating and subtracting the strong SV signal from the actual received signal and performing the subsequent correlation with the C/A code of the weak signal.

Figure 1:
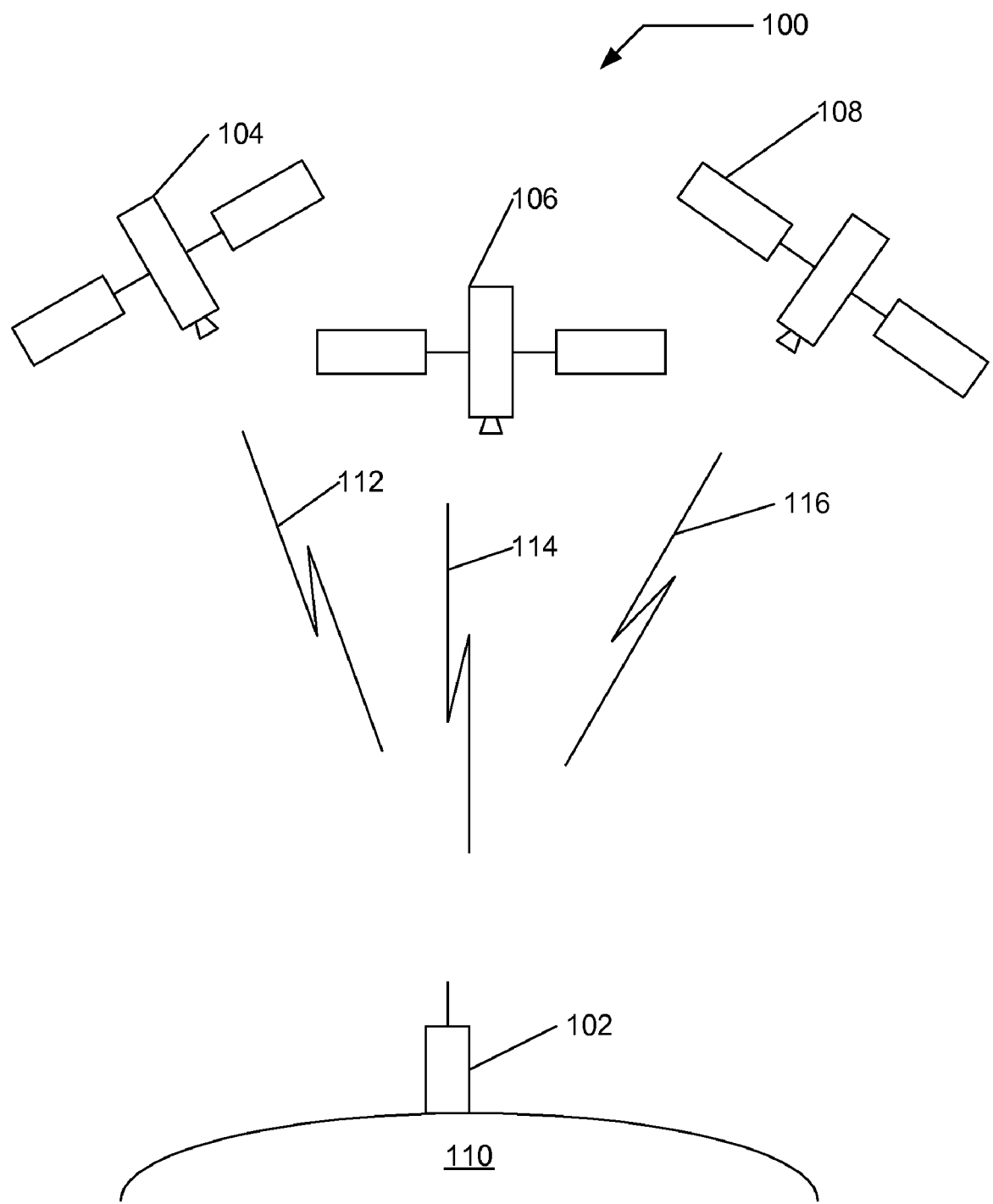
FIG. 1 is an illustration of a satellite positioning system with satellite vehicles (SVs) and a satellite positioning system receiver that has an example implementation of the invention.

FIG. 1 is an illustration of a satellite positioning system 100 with a satellite positioning system receiver (GPS receiver) 102 that has an example implementation of the invention that mitigates the effects of cross correlation and satellite positioning SVs 104, 106 and 108. The satellite positioning system receiver 102 may commonly be referred to as a Globe Positioning System (GPS) receiver. But in practice the GPS receiver may be any type of position system receiver, including Galileo receiver and Global Orbiting Navigation Satellite System (GLONASS) receiver. The SVs 104, 106 and 108 transmit CDMA encoded positioning signals 112, 114 and 116 to the GPS receiver 102 located on or near the earth 110. Typically at least two spread spectrum CDMA encoded positioning signals plus accurate time or another spread spectrum CDMA encoded positioning signals may be used to determine the position of the GPS receiver 102 on the earth 110.

Figure 2:
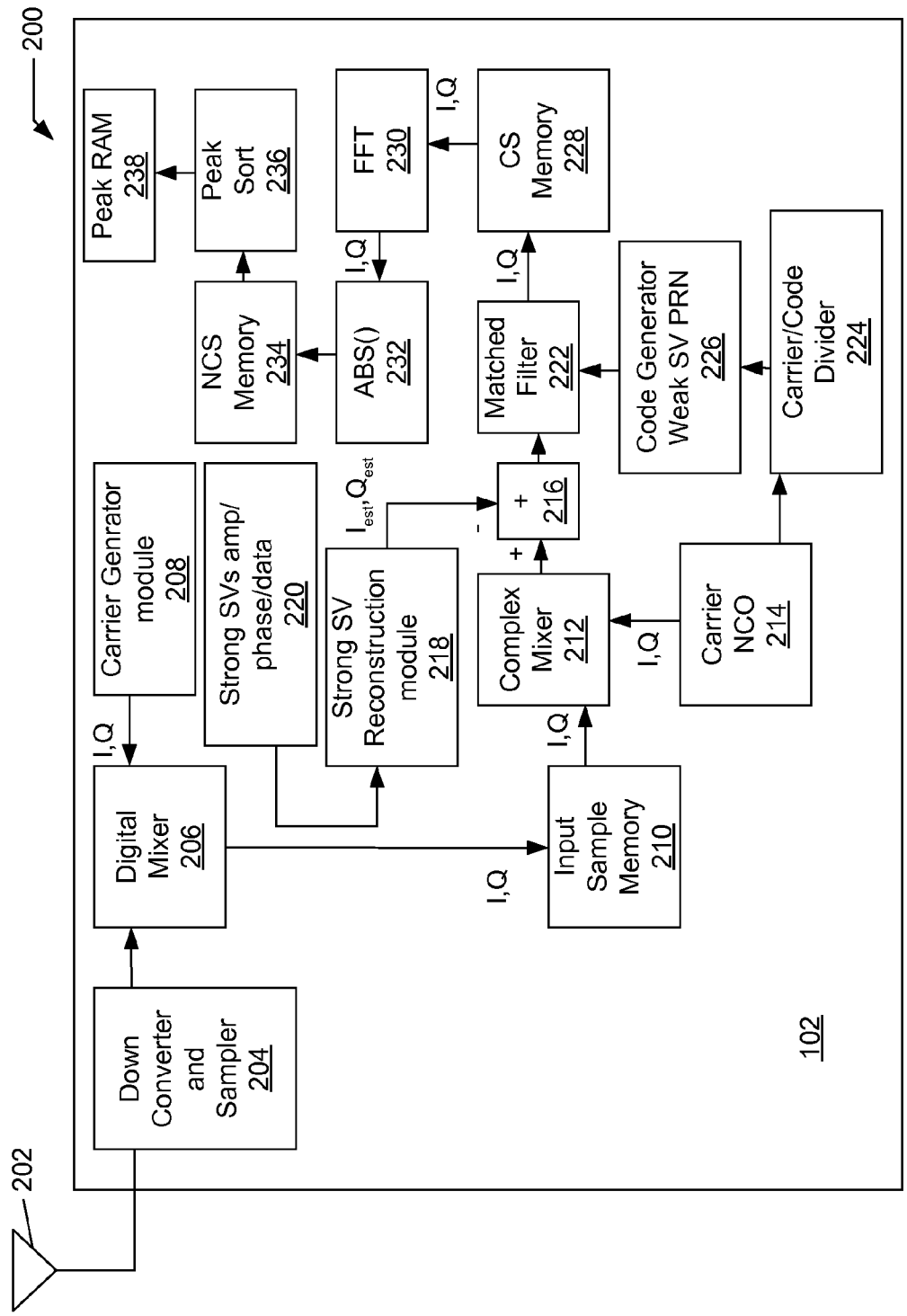
FIG. 2 is a block diagram of the example implementation of the SV positioning system receiver of FIG. 1.

FIG. 2 is a block diagram of the example implementation 200 of the satellite positioning system receiver (commonly referred to as a GPS receiver) 102 of FIG. 1. Positioning signals from the SVs 104, 106 and 108 may be received at the GPS receiver 102 via antenna 202. The positioning signals are down converted to an intermediate frequency (IF) and digitally sampled in the down converter and sampler module 204. The IF samples are then digitally mixed by digital mixer 206 with a generated carrier signal from the carrier generator module 208. The resulting I and Q signal data may be stored in an input sample memory 210. The digital samples are then mixed by a complex mixer 212 with an I and Q signal from a carrier numerical controlled oscillator 214 and result in a baseband signal.

The resulting baseband signal then has the strong SV's reconstructed signal removed by signal combiner 216. The strong SV's signal reconstruction occurs in the strong SV reconstruction module 218 and may have inputs of the amplitude, phase, and data 220 associated with a strong SV's signal. The resulting strong SV's reconstructed signal may then be removed from the resulting signal samples.

The resulting signal samples with the strong SV's signal removed are processed by matched filter 222. The carrier NCO 214 may provide a carrier offset to a carrier/code divider 224 depending on the type of GPS signals being received (GPS, Galileo, etc . . . ). The code generator 226 generates a pseudo-random number (PRN) associated with a weak CDMA signal from one of the SVs. The generated PRN is then used by the match filter 222 to process the resulting signal samples. The matched digital signal samples (I and Q) are stored in the coherent memory 228.

A fast Fourier transform (FFT) may be applied by the FFT module 230 to the matched digital signal samples and the resulting transformed digital signal samples may then have an absolute value function 232 applied. The resulting values are then stored in a non-coherent sample (NCS) memory 234. A peak sort may then be applied with the peaks stored in peak memory or peak RAM 238. The peaks indicate where the strongest matches occurred between the PRN and digital signal samples that have had the strong SV's signals removed.

Figure 3:
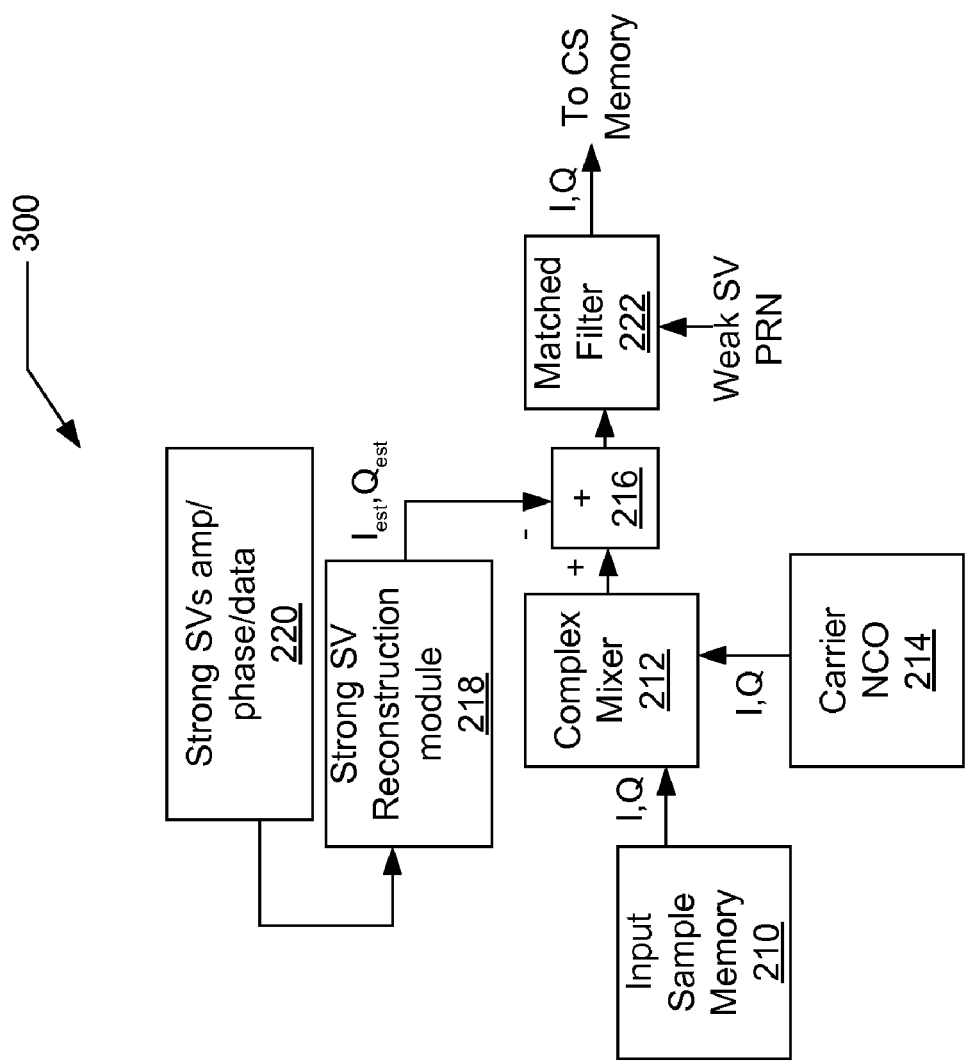
FIG. 3 is a block diagram of the example implementation of the invention showing subtraction of a reconstructed strong SV signal from a received signal for cross correlation mitigation.

FIG. 3 shows an embodiment 300 of the invention where a reconstructed SV signal that contains an estimate of the I/Q component of the received strong SV signal is subtracted from the received signal path containing signals from both the strong satellite and the weak SV to be acquired or tracked. The signal flow is shown from input sample memory 210 that stores the received signal as intermediate frequency (IF) signal samples. The carrier NCO 214 generates the carrier offset used by the complex mixer 212 to down convert the IF signal to a baseband signal. The baseband signal contains signal data from both the strong SV and the weak SV signals. The strong SV reconstruction module 218 generates the estimated signal from the strong SV that is subtracted by a signal combiner 216 from the output of the complex mixer 212.

The strong SV signal reconstruction takes as its inputs the code/carrier phase and data bits 220 from tracking the strong SV signal. The strong SV reconstruction may also require an accurate estimate of the amplitude. Cross correlation is successfully mitigated when the estimated strong satellite signal is an accurate representation of the received signal such that after the subtraction only the weak satellite signal remains to be correlated against the weak satellite C/A code or PRN in the matched filter 222. The resulting signal sample data from the matched filter 222 may then be stored in CS memory 228.

Figure 4:
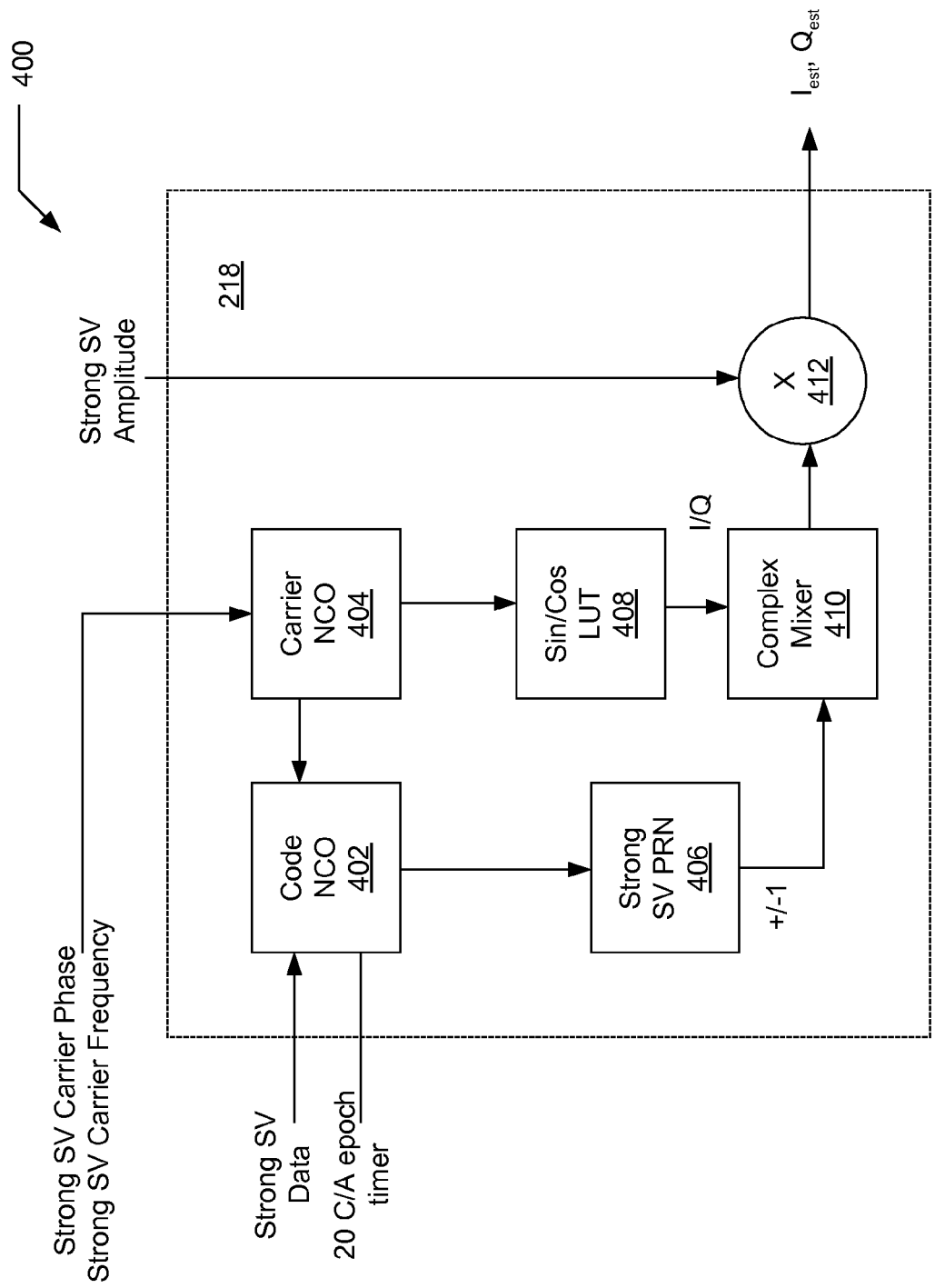
FIG. 4 is a block diagram of an example of an implementation of the invention showing construction of a strong SV signal using carrier/code phase, data, and amplitude.

FIG. 4 shows an embodiment 400 of the strong SV signal reconstruction. The code NCO 402 receives as its inputs the code phase of the strong SV from the tracking of the strong SV (acquisition of the strong SV having previously occurred). The code NCO 402 may also receive carrier aiding signals from the carrier NCO 404. The code phase tracks the code position within the 1023 C/A code period. The carrier aiding signal helps to maintain the code position by updating the nominal code position with any changes in the carrier frequency caused by Doppler or receiver oscillator error.

The output of the code NCO 402 may be used to generate the strong SV C/A code with the strong SV PRN module 406. Data modulation on the C/A code is also performed by applying the demodulated data from the strong SV tracking to the C/A code. The strong SV data in FIG. 4 may be applied on the output of the strong SV PRN module 406, where the C/A code modulated with data bit estimates may be essentially derived by the XOR of the code bits (+/−1 at 1.023 Mbps) with the data bit estimates (+/−1 at 50 bps). A control line for time may be provided between the Code NCO 402 and the strong SV data provider to time when the next data bit is used (every 20 C/A code repetitions), where the timing of the data bit edge is known as it is modulated from the SV every 20 C/A epochs on the initial state of the C/A code generator in the current implementation. The carrier NCO 404 generates the frequency offset that may be applied to the C/A code generated by the strong SV PRN module 406.

The carrier NCO 404 may take as its inputs the carrier phase and carrier frequency from the strong SV frequency determined by the SV tracking and the carrier offset used for down-converting the received signal path in FIG. 3. Thus, the strong SV carrier phase and frequency is a combination of the phase and frequency from two sources, the strong SV tracking channel and also the phase and frequency of the combined carrier mixes before the subtraction 216 of FIG. 3.

The output of the carrier NCO 404 may be further processed by the sin/cos LUT module 408 to generate a complex carrier having both I and Q components that is complex multiplied with the C/A code by complex mixer 410. The sin/cos LUT module 408 functions to create cosine and sine wave signals from the output of carrier NCO 404. The carrier NCO 404 may be a device that essentially creates a numeric sawtooth waveform on its output (e.g. count from 0 to $2^N-1$, then rollover to 0 again, where N is number of bits in the carrier NCO accumulator). The sin/cos LUT 408 takes numbers from the output of the carrier NCO 404 and translates them from 0 to 2N-1 to 0 to 360° sin and cos waveforms, where the carrier NCO output number may also be used to address the sin/cos LUT module 408. The strong SV amplitude may then be applied to the output of the complex mixer 410 via combiner 412 in order to generate an estimated strong SV signal ($I_{est}$, $Q_{est}$). The estimated strong SV signal ($I_{est}$, $Q_{est}$) may then be subtracted from the received signal.

Figure 5:
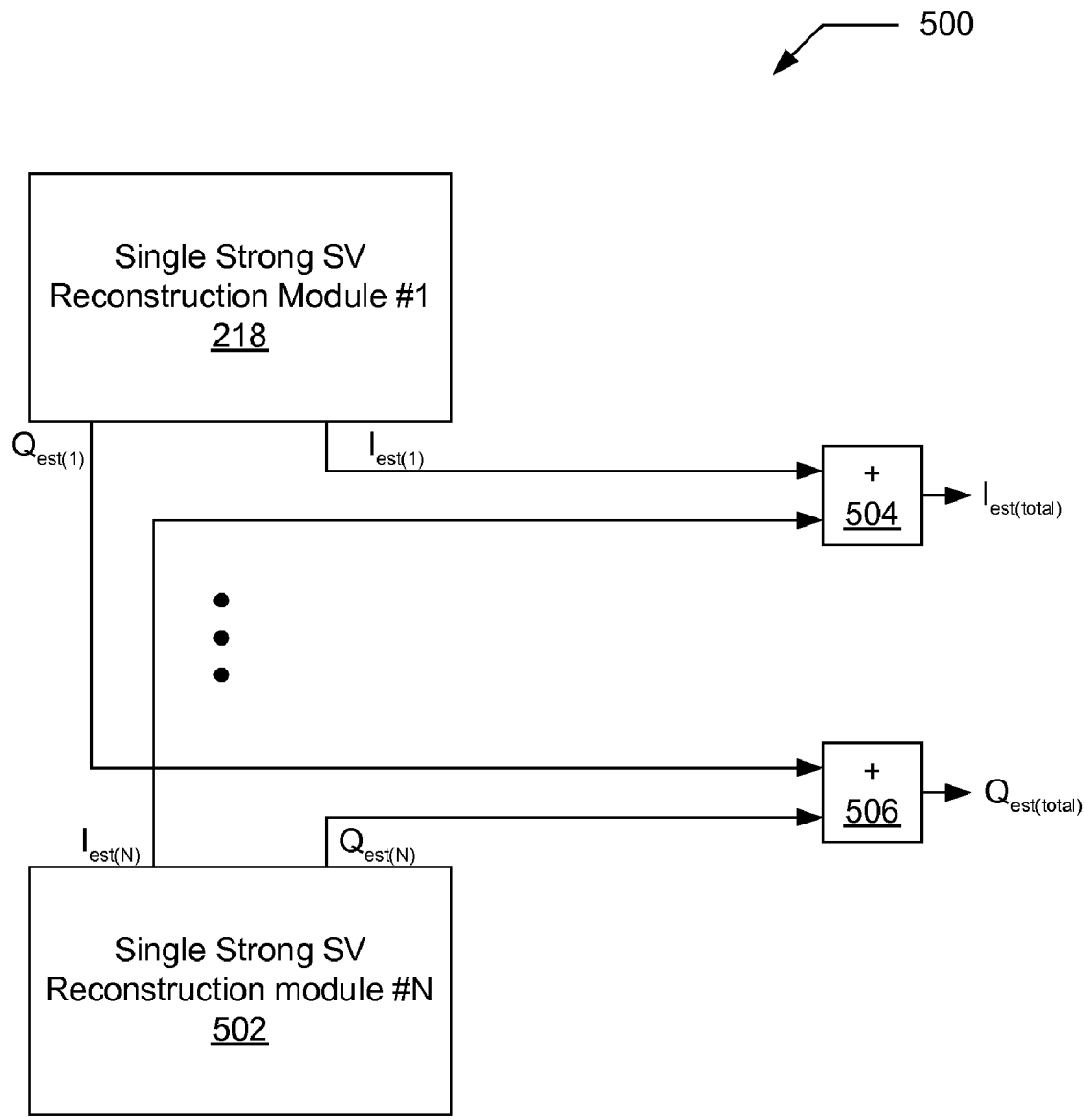
FIG. 5 is a block diagram of an example of an implementation of the invention showing combining multiple strong SV signal reconstructions to generate a combined estimated signal.

Turning to FIG. 5, construction of multiple strong SV signals may be combined to yield the estimated signal from multiple strong SVs. The block diagram of an example 500 of an implementation of the invention showing combining multiple strong SV signal reconstructions to generate a combined estimated signal is depicted. The strong SV reconstruction module 218 reconstructs the strong SV's $Q_{est(1)}$ and $I_{est(1)}$. Additional strong SV reconstructions may occur, such as strong SV reconstruction module N 502. The multiple strong SV reconstructions of respective $Q_{est}$ and $I_{est}$ may then be combined by signal combiner 504 for the $I_{est}$ and signal combiner 506 for the $Q_{est}$. The estimated strong SV signal ($I_{est(total)}$, $Q_{est(total)}$) may then be subtracted from the received signal.

Figure 6:
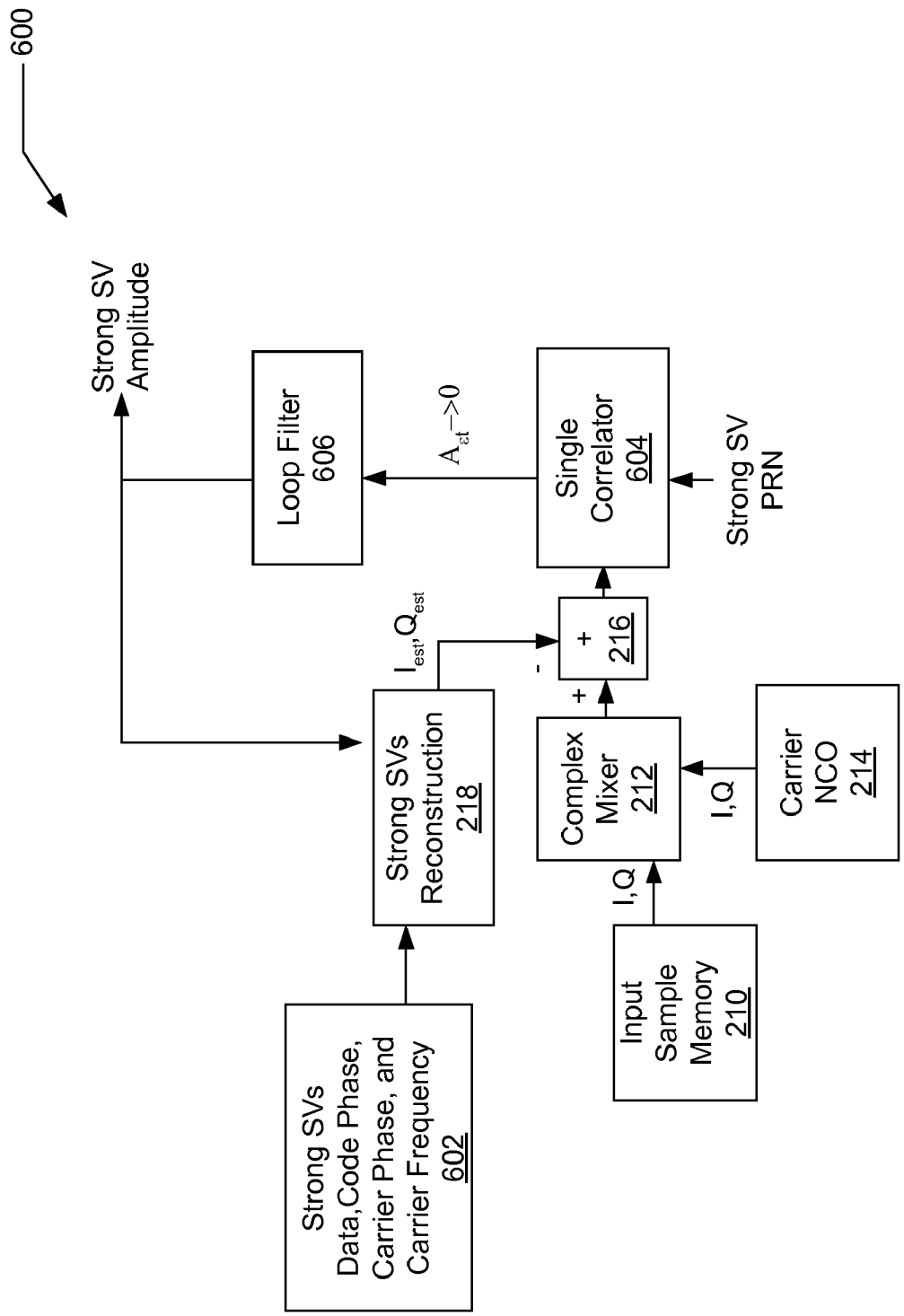
FIG. 6 is a block diagram of an example of an implementation of the invention showing a strong SV amplitude control loop.

In FIG. 6, a block diagram 600 of an example of an implementation of the invention showing a strong SV amplitude control loop is depicted. As mentioned, the cross correlation mitigation performance is sensitive to the estimated amplitude error. Because satellite tracking typically does not track the amplitude, an amplitude control loop may be employed to estimate the amplitude of the strong SV signal.

The input sample memory 210, carrier NCO 214, and complex mixer 212 may be the same as those for generating the baseband signal containing both strong and weak SV signals in FIG. 2. The strong SVs reconstruction module 218 may also be the same as that depicted in FIG. 4 that generates the estimated strong SV signals to be subtracted from the signal path by signal combiner 216. The strong SV reconstruction module 218 may receive inputs 602, such as the strong SV's data, code phase, carrier phase, and carrier frequency. The strong SVs reconstruction module 218 may also receive the strong SV amplitude from the loop filter 606.

The output of the signal combiner 216 contains the remaining weak satellite signal and is then cross correlated by the single correlator 604 with the strong SV's C/A code or PRN. The output of signal combiner 216, for the purposes of the strong SV amplitude control loop, contains the remnants of the strong SV that has not been suppressed by the cross correlation mitigation operation; in essence, the amplitude control loop operates on the strong SV only. The strong SV signal is suppressed completely via this operation such that a perfect reconstruction of the strong SV signal results. Note that the value $A_{e_t}$ (see FIG. 6) gives one an indication of how good the cross correlation operation is with this strong SV. This indication results because the value $A_{e_t}$ essentially measures the residual strong SV signal left. The single correlator 604 is shown as a single correlator, but may be extended to include other correlators (i.e., additional amplitude loops estimating amplitude at different strong SV code phase offsets).

The amplitude control loop depicted in FIG. 6 estimates the strong satellite amplitude through the loop filter 604 by minimizing the cross correlation error output. The loop parameters may be adjusted to track the amplitude variation of the strong satellite in a dynamic signal environment. When the strong SV signal's amplitude is accurately estimated its removal from the received signal path yields only the weak SV signal and minimal cross correlation with the strong satellite C/A results.

A carrier-to-noise (C/No) test may be employed to determine initially whether weak SV acquisition/tracking needs strong satellite mitigation. The procedure to mitigate cross correlation first acquires and then tracks the strong SV signals. The code phase, carrier phase/frequency from the strong SV tracking, and the demodulated data bits are obtained by the GPS receiver. They may then be used to aid in the reconstruction of the strong SV signal in two different modules of the GPS receiver. The first is the strong SV reconstruction module that is part of the amplitude control loop to estimate the amplitude of the strong SV signal as described in FIG. 6.

The second place for cross correlation mitigation where the code phase, carrier phase/frequency, data, along with the estimated amplitude from the amplitude control loop may be used to generate the strong SV signal for subtraction from the signal path is described in FIG. 2. This procedure may be repeated for as many strong satellites as need to be mitigated. The cross correlation error output from the amplitude control loop can be monitored to measure the quality of mitigation achieved.

In other implementations, the strong SV data bits may be obtained with a network connection approach (e.g. cell phone application) or by previous observation of the strong SV's data stream and predicting that they will be similar or predictable in future. Another approach to obtaining the strong SV's data bits may be to observe the first 1 millisecond of the strong SV's 20 msec data bit period and estimating the rest of the data bit from this short segment of each data bit. The incoming weak signal reception may be delayed (in memory) while the strong SV data bit is estimated or just nulled out (zeroed at output of matched filter during weak signal reception where it is known the strong SV data is not known).

Figure 7:
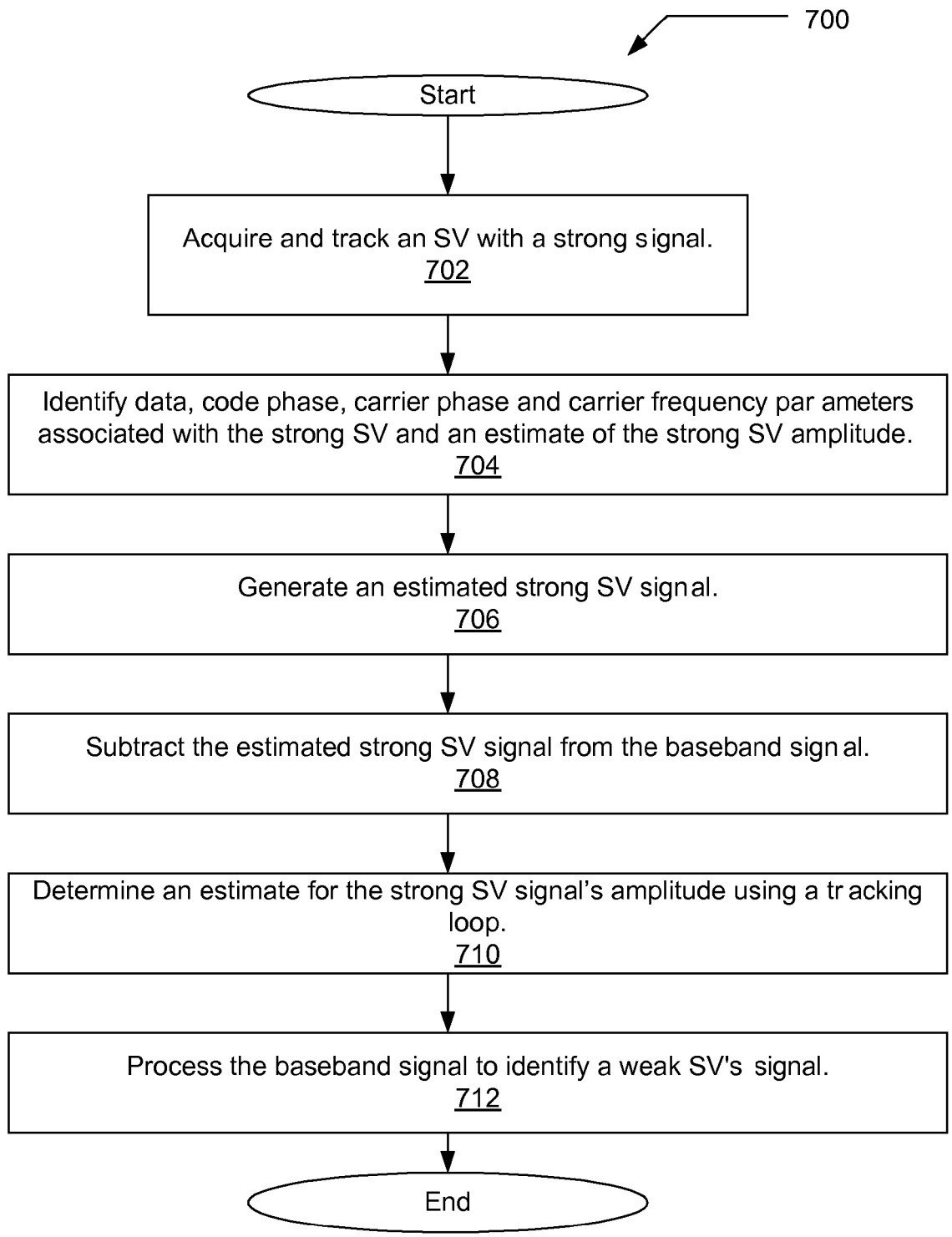
FIG. 7 is a flow diagram of an example implementation of a process for mitigating the effects of cross-correlation in the GPS receiver of FIG. 2.

FIG. 7 is a flow diagram 700 of an example implementation of a process for mitigating the effects of cross correlation in the GPS receiver 102 of FIG. 2. An SV with a strong signal is acquired and tracked 702 by the GPS receiver 102. The strong SV reconstruction module 218 then may receive data, code phase, carrier phase and carrier frequency parameters associated with the tracked SV 704. The strong SV reconstruction module 218 then employs the parameters to generate an estimated strong SV signal 706.

The estimated strong SV signal is then subtracted from the baseband signal 708 by signal combiner 216. The resulting baseband signal may be used in a amplitude tracking loop to determine an estimate of the strong SV signal's amplitude 710. The resulting baseband signal may also be used to identify a weak SV's signal using matched filter 222. This process may also be repeated to generate an estimated strong SV signal from multiple SVs with strong signals as described in FIG. 5.

Furthermore, the multiple process steps implemented with a programming language, which comprises an ordered listing of executable instructions for implementing logical functions, can be embodied in any machine-readable media for use by or in connection with an instruction execution system, apparatus, or device, such as a computer-based system, controller-containing system having a processor or controller, such as a microprocessor, digital signal processor, discrete logic circuit functioning as a controller, or other system that can fetch the instructions from the instruction execution system, apparatus, or device and execute the instructions.

While various embodiments of the invention have been described, it will be apparent to those of ordinary skill in the art that many more embodiments and implementations are possible within the scope of this invention. Moreover, it will be understood that the foregoing description of numerous implementations has been presented for purposes of illustration and description. It is not exhaustive and does not limit the claimed inventions to the precise forms disclosed. Modifications and variations are possible in light of the above description or may be acquired from practicing the invention. The claims and their equivalents define the scope of the invention. Accordingly, the invention is not to be restricted except in light of the attached claims and their equivalents.

What is claimed is:

1. A method for acquiring or tracking weak satellite vehicle (SV) signals in the presence of strong SV signals by mitigating the cross correlation of a received signal from the strong SV signals and a clear/acquisition (C/A) code of a received signal from a weak SV, comprising:
estimating at least two strong SV signals;
combining the at least two estimated strong SV signals;
subtracting the combined estimated strong SV signals from the actual received signal from a weak SV; and
performing correlation of the subtracted signal with the C/A code of the weak SV.

2. The method of claim 1, where each of the at least two strong SV signals is reconstructed using a code phase obtained from tracking each of the at least two strong SV signals.

3. The method of claim 2, where the code phase of each of the at least two strong SV signals is maintained with carrier-to-code aiding to track any change in the carrier frequency caused by Doppler or oscillator error.

4. The method of claim 1, where each of the at least two strong SV signals is reconstructed using demodulated data bits obtained from tracking each of the at least two strong SV signals.

5. The method of claim 1, where each of the at least two strong SV signals is reconstructed using a carrier phase and carrier frequency obtained from tracking each of the at least two strong SV signals.

6. The method of claim 1, where each of the at least two strong SV signals is reconstructed using an estimated amplitude of the at least two strong SV signals.

7. The method of claim 6, where estimating the amplitude of each of the at least two strong SV satellite signals comprises:
reconstructing each of the at least two strong SV signals;
subtracting each of the reconstructed at least two strong SV signals from the actual received signal;
performing correlation of the subtracted signal with the C/A of each of the at least two strong SV signals; and
updating the estimated amplitude to minimize such correlation.

8. The method of claim 7, where each of the at least two strong SV signals is reconstructed using code phase, carrier phase, carrier frequency, and demodulated data bits obtained from tracking each of the at least two strong SV signals.

9. The method of claim 1, where a carrier-to-noise (C/No) test is used to determine whether strong SV cross correlation mitigation is necessary.

10. The method of claim 1, where each of the at least two strong SV signals is first acquired and tracked to derive a code phase, carrier phase, carrier frequency, and demodulated data bits.

11. The method of claim 7, where a cross correlation error output from an amplitude control loop can be monitored to measure the quality of mitigation achieved.

12. A GPS position signal receiver, comprising:
an input sample memory in receipt of digital samples of positioning signals from at least two satellite vehicles (SVs);
a carrier numerical controlled oscillator that generates a carrier offset signal;
a complex mixer that combines digital samples from the input sample memory and the carrier offset signal from the carrier numerical controlled oscillator and results in a baseband signal;
a strong satellite reconstruction module that generates an estimated strong SV signal; and
a signal combiner that subtracts the estimated strong SV signal from the base band signal prior to filtering the baseband signal with a matched filter having a weak SV pseudo random number (PRN) as an input.

13. The GPS receiver of claim 12, where the strong satellite reconstruction module further includes a complex mixer that multiplies a complex carrier with a strong SV PRN and then applies a strong SV amplitude signal that results in the estimated strong SV signal.

14. The GPS receiver of claim 13, where the complex carrier is generated by a sin/cos LUT module that is in receipt of a frequency offset from a second carrier numerical controlled oscillator.

15. The GPS receiver of claim 12, where the strong satellite reconstruction module further includes the strong satellite reconstruction module being in receipt of phase, carrier frequency, and data information associated with the strong SV signal.

16. The GPS receiver of claim 12, further including an amplitude control loop that estimates the amplitude of the strong SV signal and cross correlates the output of the signal combiner.

17. The GPS receiver of claim 16, where the amplitude control loop tracks amplitude variations of the strong SV signal in a dynamic signal environment.

18. A computer-readable medium containing controller-executable instructions that when executed result in a method for acquiring or tracking weak SV signals in the presence of strong SV signals by mitigating cross correlation of a received signal from the strong SV signals and the C/A code of a received signal from a weak SV, the controller-executable instructions comprising instructions for:
estimating each of the at least two strong SV signals;
combining the at least two strong SV signals;
subtracting the combined estimated strong SV signals from the actual received signal from a weak SV; and
performing correlation of the subtracted signal with the C/A code of the weak SV.

19. The computer-readable medium containing controller-executable instructions of claim 18, where each of the at least two strong SV signals is reconstructed using a code phase obtained from tracking each of the at least two strong SV signals.

20. The computer-readable medium containing controller-executable instructions of claim 19, where the code phase of each of the at least two strong SV signals is maintained with carrier-to-code aiding to track any change in a carrier frequency caused by Doppler or oscillator error.

21. The computer-readable medium containing controller-executable instructions of claim 18, where each of the at least two strong SV signals is reconstructed using demodulated data bits obtained from tracking each of the at least two strong SV signals.

22. The computer-readable medium containing controller-executable instructions of claim 18, where each of the at least two strong SV signals is reconstructed using a carrier phase and carrier frequency obtained from tracking each of the at least two strong SV signals.

23. The computer-readable medium containing controller-executable instructions of claim 18, where each of the at least two strong SV signals is reconstructed using an estimated amplitude of each of the at least two strong SV signals.

24. The computer-readable media containing controller-executable instructions of claim 23, where estimating the amplitude of each of the at least two strong SV signals comprises:
   reconstructing each of the at least two strong SV signals;
   subtracting each of the reconstructed at least two strong SV signals from the actual received signal from a weak SV;
   performing correlation of the subtracted signal with the C/A of each of the at least two strong SV signals; and
   updating the estimated amplitude to minimize such correlation.

25. The computer-readable medium containing controller-executable instructions of claim 24, where each of the at least two strong SV signals is reconstructed using code phase, carrier phase, carrier frequency, demodulated data bits obtained from tracking each of the at least two strong SV signals.

26. The computer-readable medium containing controller-executable instructions of claim 24, where the cross correlation error output from the amplitude control loop is monitored to measure quality of mitigation achieved.

27. The computer-readable media containing controller-executable instructions of claim 18, where a software C/No test is used to determine whether strong SV cross correlation mitigation is necessary.

28. The computer-readable medium containing controller-executable instructions of claim 18, where each of the at least two strong SV signals is first acquired and tracked to derive code phase, carrier phase, carrier frequency, and demodulated data bits.

\* \* \* \* \*